(No Model.) 4 Sheets—Sheet 1.
T. O. PERRY.
PNEUMATIC PUMPING ENGINE.
No. 485,882. Patented Nov. 8, 1892.
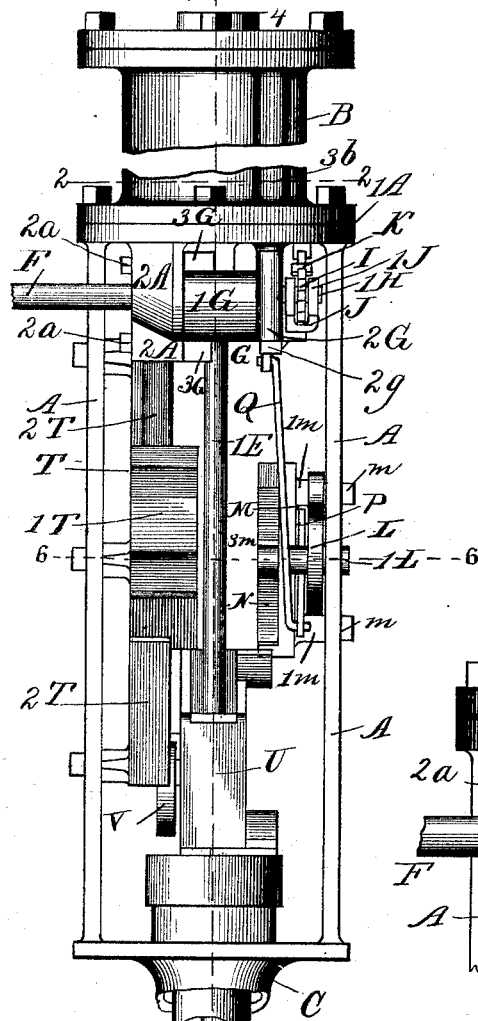
Fig.1
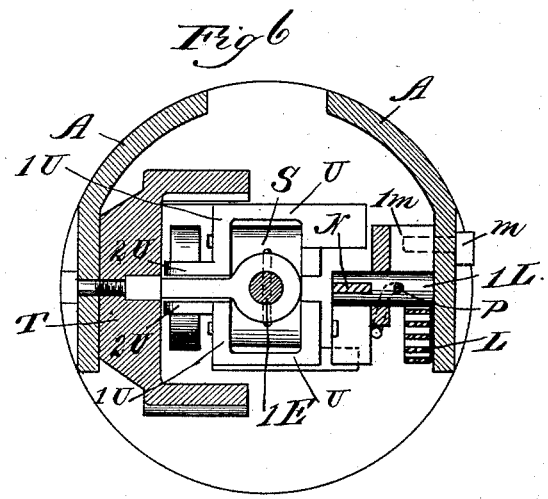
Fig.6
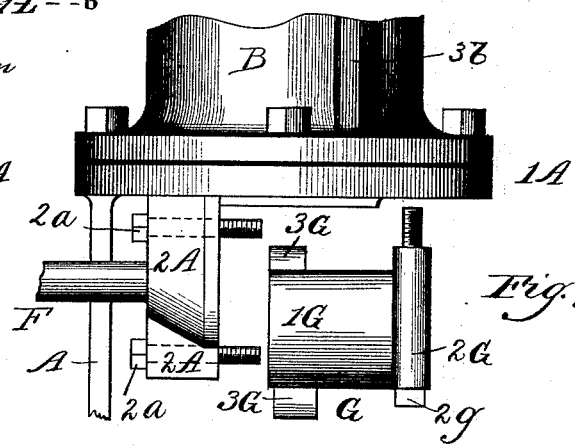
Fig.7
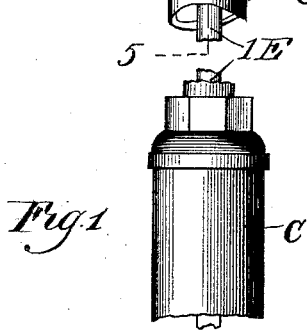
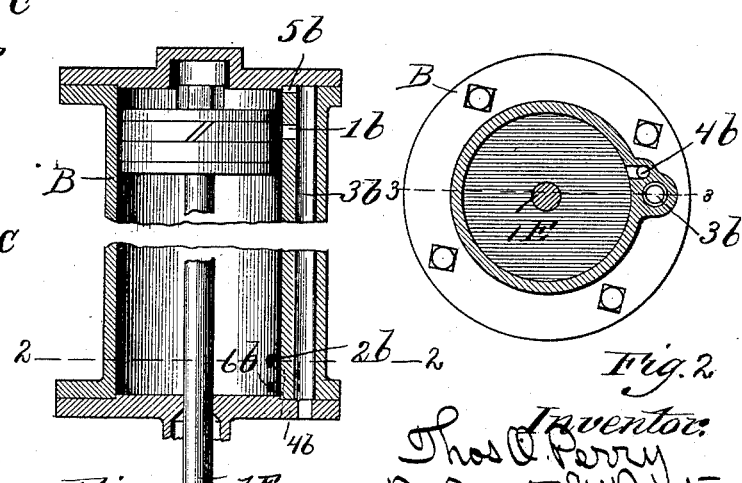
Fig.3 Fig.2
Witnesses
J. L. Tunison
Jean Elliott
Inventor:
Thos. O. Perry
By Burton and Burton
his Attorneys

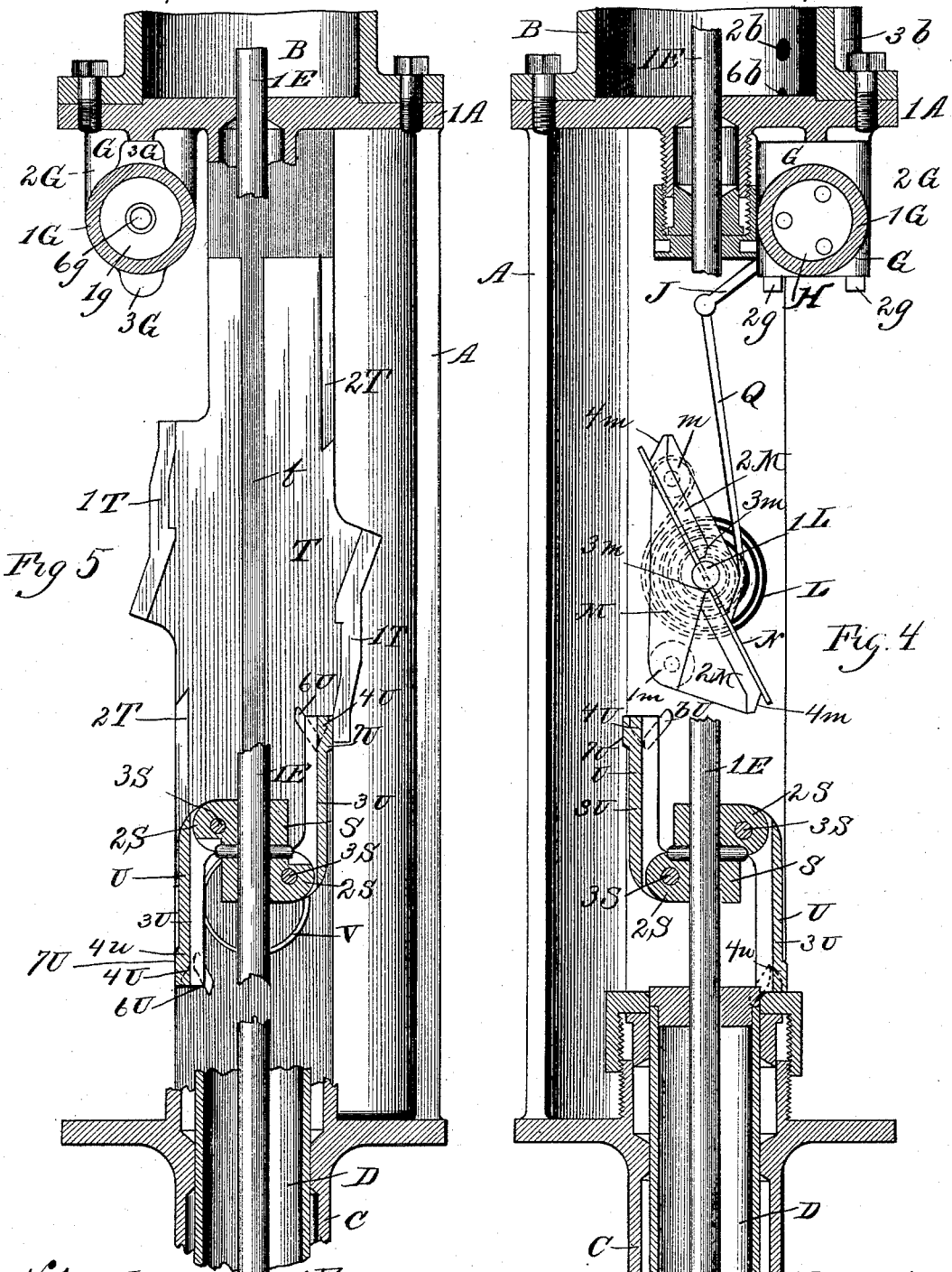

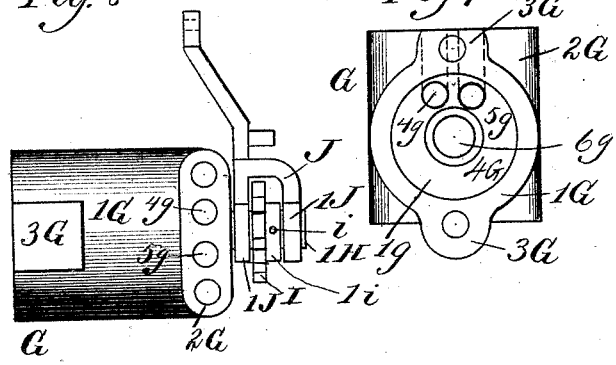
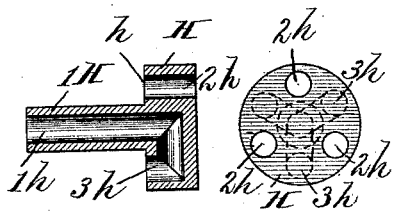
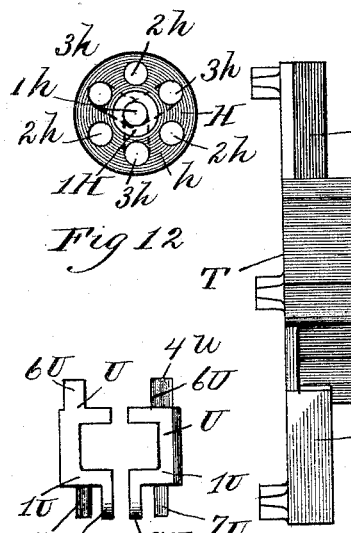
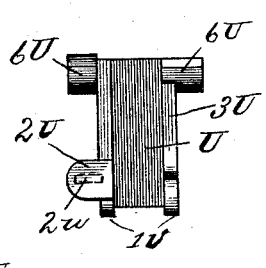
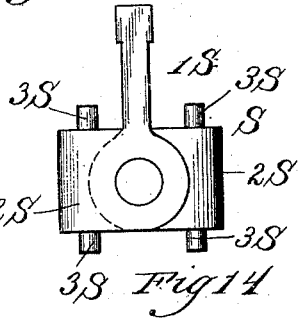
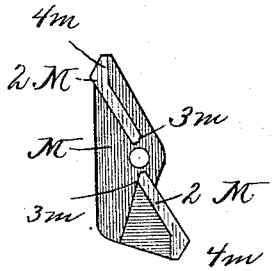

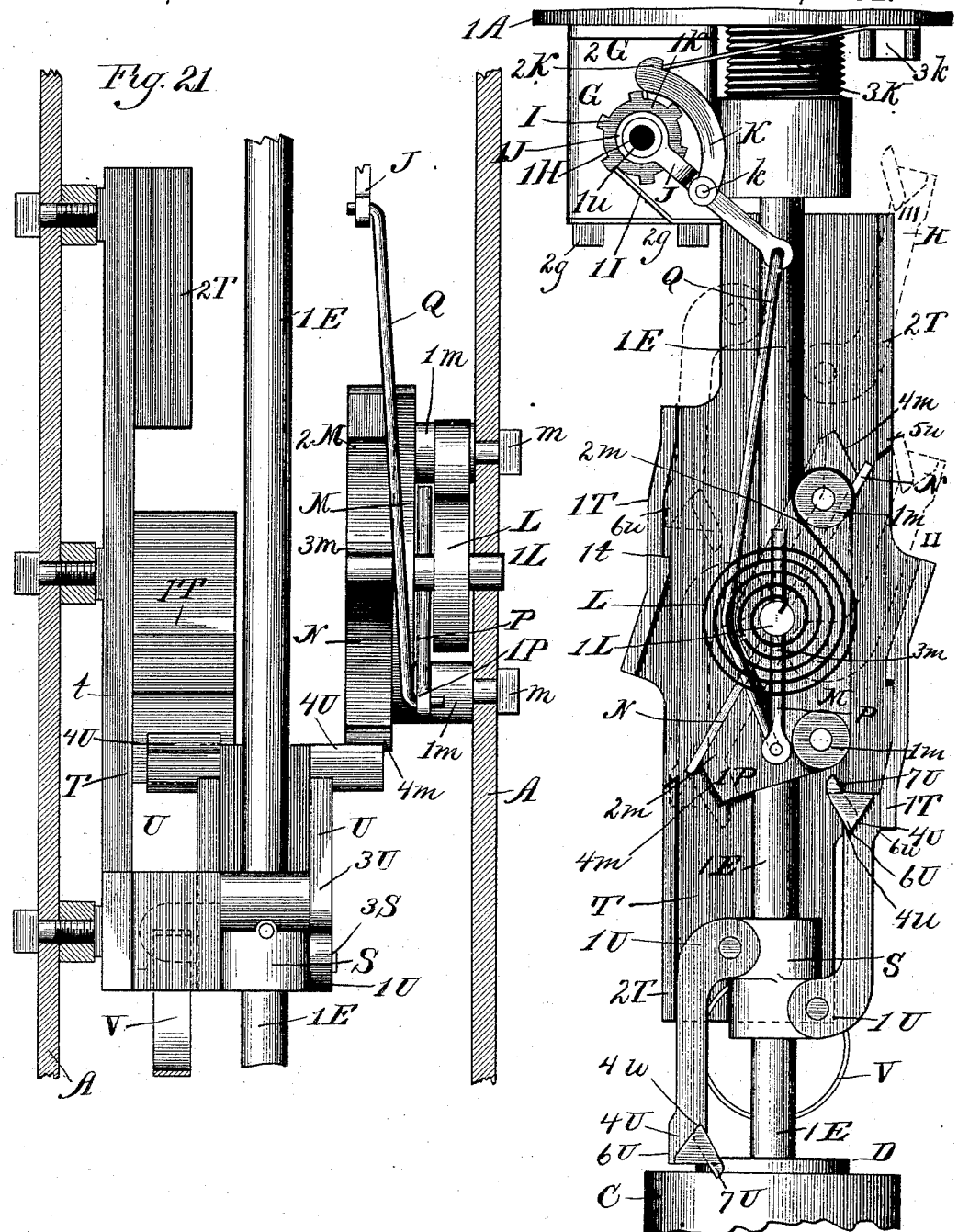

UNITED STATES PATENT OFFICE.

THOMAS O. PERRY, OF CHICAGO, ILLINOIS.

PNEUMATIC PUMPING-ENGINE.

SPECIFICATION forming part of Letters Patent No. 485,882, dated November 8, 1892.

Application filed November 9, 1891. Serial No. 411,354. (No model.)

*To all whom it may concern:*

Be it known that I, THOMAS O. PERRY, a citizen of the United States, residing at Chicago, county of Cook, and State of Illinois, have invented a certain new and useful Improvement in Pneumatic Pumping-Engines, which is fully set forth in the following specification, reference being had to the accompanying drawings, forming a part thereof.

This invention pertains to pneumatic engines, and is particularly illustrated in connection with a pumping-engine—that is, one having a pump combined with the engine proper, so that the piston-rod of the engine is the pump-rod of the pump; but this invention is not limited to the uses of the device herein described in connection with a pump.

The particular features of the invention are those which pertain to the air-controlling valve and its operating mechanism.

In the drawings, Figure 1 is a front elevation of a pneumatic engine or pumping-engine embodying my invention. Fig. 2 is a section at the line 2 2 on Fig. 1, and Fig. 3 is an axial section through the cylinder at the line 3 3 on Fig. 2. Fig. 4 is a detail section at the plane of the line 4 5 on Fig. 1 looking to the right. Fig. 5 is a section at the same plane looking to the left. Fig. 6 is a section at the line 6 6 on Fig. 1. Fig. 7 is a detail elevation of the upper part of the frame, which comprises the base of the engine-cylinder and the casting which contains the valve-seat, showing said castings detached from each other, but in position to indicate the manner of assembling them. Fig. 8 is a top plan of the valve-seat casting above mentioned and the valve-ratchet mechanism at the end of it. Fig. 9 is an end elevation of the opposite end of said casting. Fig. 10 is an axial section of the valve. Fig. 11 is an elevation of its outer end, and Fig. 12 is an elevation of its inner end. Fig. 13 is an outer side elevation of a plate which is rigid with the frame and comprises sundry cams and other guides to control the action of the tripping mechanism which operates the valve-actuating mechanism. Fig. 14 is a plan, Fig. 15 is a front elevation, and Fig. 16 is a side elevation, of a collar which is pinned onto the piston-rod and has pivoted to it the tripping-dogs which operate the trip which governs the ratchet mechanism. Fig. 17 is a plan, and Fig. 18 is a side elevation, of the tripping-dogs in relative positions. Fig. 19 is a front elevation of one of the tripping-dogs. Fig. 20 is a front elevation of a stop for the trip which is concerned in operating the ratchet mechanism. Fig. 21 is an elevation of the tripping mechanism, the parts being shown in several positions in dotted line and the supporting-frame being omitted. Fig. 22 is a detail sectional front elevation of the tripping mechanism, the supporting-frame being shown in section at a plane through the attaching-bolts.

I have illustrated a pumping-engine—that is, a pump with a pneumatic engine which operates it mounted on the same rigid frame, the pump-rod and engine piston-rod being the same; but since the pump mechanism has nothing directly to do with this invention it is represented only conventionally and only with respect to exterior appearance.

A is the exterior frame, at one end of which is fixed the engine-cylinder B, the other end having rigidly fixed to it the pump barrel or tube through which the pump-rod plays and water is elevated. C represents said barrel, and D the pump-cylinder proper. No further reference to these parts of the pump nor description of them will be made.

The engine-cylinder B has ports $1^b$ and $2^b$ near its opposite ends. Ducts $3^b$ and $4^b$, alongside the cylinder B, lead to the ports, respectively. These ports $1^b$ $2^b$ are not at the extreme ends of the piston-chamber $b$; but from the same ducts $3^b$ and $4^b$ which lead to said ports small branches lead to the ports $5^b$ and $6^b$, which are located at the extreme ends of the cylinder. The principal ports $1^b$ and $2^b$ admit compressed air alternately at opposite sides of the piston E, and serve alternately as vent-ports from the cylinder, and the purpose of locating them at a little distance from the ends of the cylinder and providing the supplemental small ports $5^b$ and $6^b$ is that as the piston returns toward either end, the air being driven out before it through the ports at that end, the piston will cover and close the large ports before it reaches the end of the cylinder and will cushion against the air which remains in the cylinder beyond said larger ports, because the smaller ports will permit only a gradual escape of the air, thus avoiding shocks at the limit of the piston's stroke. The ducts $3^b$ and $4^b$ lead to the lower end of the cylinder and there register with their proper continuations, respectively, similarly lettered, which extend through the horizontal disk or top plate $1^A$ of the frame A. This horizontal top plate $1^A$ has the downwardly-projecting lug $2^A$, into which is screwed the compressed-air-supply pipe F, the hole into which the pipe is connected extending through the lug to the inner vertical face of the latter, and into the angle between the lower horizontal face of the top plate $1^A$ and the said vertical face of the lug $2^A$ there is bolted the casting G, which contains the seat and chamber for the rotary valve hereinafter described. This casting G comprises the cylindrical part $1^G$, which contains the valve-chamber $1^g$ and the oblong part $2^G$, transverse to the axis of the cylindrical part at the outer end of the latter, and has, in addition, the lugs $3^G$ $3^G$, which project radially with respect to the cylindrical part at the outer end of the latter and are flush with that end. Bolts $2^a$ $2^a$ pass through the lug $2^A$ on the frame and enter the lugs $3^G$, respectively, while bolts $2^g$ pass vertically through the oblong cross part $2^G$ and enter the base of the top plate $1^A$ of the frame, and by said four bolts the casting G, which may be termed the "valve-bearing," is made rigid with the frame A, packing being interposed, if necessary, to make its junction with the frame both at the horizontal and at the vertical planes air-tight. The cylindrical part $1^G$ has a cylindrical cavity $1^g$ extending from the end which abuts upon the lug $2^A$ to the valve-seat $4^G$, which forms the bottom or end of said cylindrical cavity. In the transverse oblong part $2^G$ the continuations of the ducts $3^b$ and $4^b$ make a short turn and open through the valve-seat at the ports $4^g$ $5^g$, as seen in Fig. 8. The valve-seat has the central aperture $6^g$, through which the stem of the valve protrudes.

H is the valve; $1^H$, its stem. Said stem passes, as stated, through the aperture $6^g$ in the seat, and the annular face $h$ of the valve is presented to the seat. The valve has six ports, three of which $2^h$ $2^h$ $2^h$ extend entirely through the valve, while the other three $3^h$ $3^h$ $3^h$ pass only part way through and connect each by a radial port with the central duct $1^h$ of the stem. The ports $2^h$ and $3^h$ alternate with each other at equal distances in a circle about the axis of the valve, and are therefore sixty degrees apart, and the ports $5^g$ $6^g$ in the valve-seat are sixty degrees apart in a circle of the same circumference. It will be evident, therefore, that whenever one of the ports $3^h$ is registered with either of the seat-ports $4^g$ $5^g$ one of the adjacent valve-ports $2^h$ will register with the other seat-port. The seat-port which registers with the port $2^h$ will receive compressed air and conduct it to the engine-cylinder and to one side or the other of the piston therein, according to which of the ports $4^g$ $5^g$ is thus registered with the port $2^h$. The other seat-port registering with the valve-port $3^h$ affords vent for the air from the other side of the piston through the valve-stem by way of the duct $1^h$ therein. Mechanism which will rotate the valve by stages of one-sixth of a revolution each every time the piston makes a stroke in either direction will reverse the order of communication of the cylinder-ports, and assuming that at the commencement of the operation the piston was at the end of the cylinder whose port was in communication with the compressed air, so that it was in position to make a stroke toward the other end under the tension of the compressed air, it will be evident that the reversal of the communication accomplished by its reaching the other end of its stroke will by transferring the air-pressure to the opposite side of the piston and permitting vent from the side first exposed cause the reciprocation of the piston, which is the purpose of the structure. The mechanism for thus rotating the valve by sixty-degree stages I will now describe.

I is a ratchet-wheel on the stem $1^H$ of the valve H, which is applied and pinned fast thereon after the valve has been inserted in the valve-bearing and protruded through the valve-seat, as above described.

J is a forked lever, between the arms of which the ratchet I stands on the valve-stem, said forked lever J having eyes $1^J$ $1^J$, which afford it bearings on the stem, one on each side of the ratchet. It will be understood that the ratchet and forked lever must be simultaneously placed onto the valve-stem, the ratchet being pinned thereonto, while the forked lever is left free and retained by the ratchet.

$i$ represents the pin which secures the ratchet to the valve-stem, a boss $1^i$ being formed on the hub of the ratchet-wheel to receive the pin, as seen in Fig. 9.

K is a pawl pivoted at $k$ on the lever J and having the tooth $1^K$ adapted to engage the ratchet-wheel I. It has on the back side the shoulder $2^K$, and there is further provided the spring $3^K$, secured to the frame A by the bolts $3^k$ and resting its free end upon the back or upper side of the pawl K, the shoulder $2^K$ being in position to be brought in collision with said end of the spring and be stopped thereby by the downward movement of the free end of the lever J.

$1^I$ is a spring secured to the casting G and having its free end riding on the ratchet-wheel and adapted to engage its teeth to operate as a detent-pawl to prevent reverse rotation. The teeth of the ratchet-wheel are very nearly square-topped, and the tooth $1^K$ of the pawl K has a broad top adapted to ride on the ends of the ratchet-teeth for a little distance without dropping into the intervening notches of the ratchet, and the position of the detent-pawl spring $1^I$ relatively to the tooth $1^K$ and the shoulder $2^K$ of the pawl and the end of the spring $3^K$ is such as to run off a tooth of the ratchet-wheel substantally at the same instant as the shoulder $2^K$ of the pawl encounters the end of the spring $3^K$ when the pawl is making the movement which rotates the ratchet-wheel to carry a tooth from under the detent-pawl, so that the forward and reverse movements of the ratchet-wheel are both limited at the same point, that point being the point at which the proper registration of the valve-ports with the seat-ports occur. This construction prevents the pawl from being thrown too far by the momentum of its ratchet-actuating stroke, and also prevents the ratchet-wheel from being rotated too far by its own momentum derived from such actuating-stroke of the pawl. The lever J is actuated, the ratchet I operated, and the valve rotated by the mechanism which I will now describe.

L is a spiral spring, the inner end of which is made fast to a rock-shaft $1^L$, which is journaled in the plate M, which is secured by the bolts $m$ to the right-hand side of the frame A. The outer end of the spring is hooked around and thereby made fast to one of the bosses $1^m$, into which the bolts $m$, which secure the plate to the frame A, take. The rock-shaft extends, also, into the upright side of the frame A and obtains bearing therein. The rock-shaft projects through the plate M away from the upright side of the frame in which it is journaled toward the other side, and through the portion thus projecting in a slot provided for that purpose the trip-bar N is inserted and is made fast to the rock-shaft $1^L$. The plate M has projecting from the face which is toward the trip-bar N, two stop-ribs or bosses $2^M$ $2^M$ whose stop-faces $2^m$ are parallel on opposite sides of the axial line of the rock-shaft $1^L$, so that the distance between the parallel planes of said faces is equal to the thickness of the trip-bar N, so that said bar may rest one side of the portion of its length which protrudes one way from the shaft $1^L$ against one of said faces $2^m$ and the other side of the portion of its length which protrudes the other way from said shaft on the other of the faces $2^m$. The inner ends of said bosses are cut off at the surfaces $3^m$ $3^m$, which bear relation to each other and to the axis of the shaft $1^L$, precisely similar to that above described with respect to the faces $2^m$, so that the planes $3^m$ are inclined one way from a vertical plane through the axis of the pin as much as or more than the pins $2^m$ are inclined the other way from said vertical plane, so that the trip-bar N may rock from one oblique position to the opposite oblique position between the stop-faces $2^m$ and $3^m$. The spring L is coiled in such direction that it tends to hold the trip-bar against the faces $2^m$. The ends of the flanges or ribs $2^M$ are cut off obliquely at $4^m$, said surfaces $4^m$ being oblique not only to the faces $2^m$, but also to the vertical plane of the axis of the spring, and the trip-bar N, resting on the surfaces $2^m$, projects beyond the ends of the ribs or flanges $2^M$, so that angles are defined between the faces $4^m$ and said trip-bar. Through the shaft $1^L$, alongside the spring L and between the latter and the plate M, there is inserted the rod P, which constitutes a lever-arm of the rock-shaft $1^L$, said lever-arm P terminating at one end in an eye $1^P$. A link Q is pivotally connected to said lever-arm at that eye, the other end of the link being pivotally connected to the free end of the forked lever J. The normal position of the lever-arm P—that is, the position in which it is held by the spring L, acting upon the rock-shaft $1^L$, restrained by the trip-bar N resting against the faces $2^m$—is vertical with the eye $1^P$ at the lower end. This, therefore, is the lowest position that said eye can occupy in any rocking of the rock-shaft $1^L$, and the lowest position of the end of the lever J is also substantially in the vertical plane of the rock-shaft $1^L$ and below the horizontal plane of the valve. In order, therefore, that the link Q should connect the two levers, it must be bent to pass around the rock-shaft and so much of the plate M as affords bearing for the rock-shaft, and it is accordingly so constructed, as seen in Fig. 22. To the piston-rod $1^E$ there is pinned fast at a point which at the middle position of the piston's movement is about on a level with the rock-shaft $1^L$ the collar S. This collar has a vertical flange $1^S$, extending to the left and obtaining guide-bearing in the plate T, hereinafter more particularly described, which is bolted fast to the frame, and has the longitudinal groove $t$ to receive the said flange $1^S$ of the collar S. Said collar has two bosses $2^S$ $2^S$, projecting horizontally to the front and to the rear, and to said bosses there are pivoted trip-dogs U U, pins $3^S$ $3^S$, serving to connect the dogs to the collar and operate as pivots for the former. Each of the trip-dogs U U has the lugs $1^U$, by which it is pivoted to the collar, and a lug $2^U$, projecting at right angles to and in a plane at right angles to the lugs $1^U$, said lugs $2^U$, therefore, standing parallel and facing each other when the dogs are connected to the collar, as seen in Fig. 17. Lugs $2^U$ have an oblong slot $2^u$ and a C-shaped spring V of flat steel, which has its ends inserted in said slots $2^u$, respectively, and tends to rock the dogs over their pivots in a direction to force said lugs $2^U$ toward each other. Said lugs $2^U$ are located on the side of the dogs, which brings them, when the dogs are pivoted on the collar, on that side of the collar from which the rib $1^S$ projects, and said lugs, as they are forced by the spring, stop against the opposite sides of said rib. The faces of the lugs which thus encounter the parallel faces of the rib are parallel to the general direction of the arms $3^U$ of the dog, so that when the lugs are thus stopped against the parallel faces of the rib $1^S$ said arms are extended vertically, the one being extended upward and the other downward from the pivot. It should be noticed that the lugs $2^U$ are located in the same direction from the pivots of the dogs to which they respectively pertain, as are the arms $3^U$ of said dogs, and that the bosses $2^S$ on the collar S are located one at the upper and the other at the lower end of the collar on opposite sides, so that the dogs pivoted at the centers of those bosses, respectively, are pivoted not only at opposite sides of a vertical plane through the axis of the collar, but on opposite sides of the horizontal plane through the centers of the lugs $2^U$, at which the ends of the spring V attach, so that said spring, operating to force the lugs toward each other and toward the vertical plane of the axis of the collar, tends to hold the arms of the dogs also toward the same vertical plane by reason of the fact that the pivots of said dogs are on opposite sides both of the plane in which the spring exerts its pressure and toward which it exerts its pressure.

$1^T$ $1^T$ and $2^T$ $2^T$ are flanges which project from the plate T toward the opposite of the frame from that at which said plate is secured. They are respectively of the nature of cams and switches to control the movement of the trip-dogs, and their specific functions will be hereinafter explained.

The dogs have the heads $4^U$, which project toward the side of the frame at which the trip-bar is mounted, so far that the said trip-bar is in the path of reciprocation of said heads as the dogs are carried by the piston. At the other side of the frame the flanges $1^T$ project inward from the plate T into the path of the ribs $6^U$ on the dogs, and from that side of the dogs the spur $7^U$ projects outward toward the plate T, and the flanges $2^T$ project from that plate not so far as the flanges $1^T$, but nevertheless far enough to stand in the path of the spurs $7^U$, respectively. In the operation of this mechanism, as will hereinafter appear, one of the dogs operates to rock the trip-bar during one stroke of the piston and the other dog during that stroke is idle, while during the other stroke of the piston the situation is reversed. In describing the operation of this mechanism during either stroke the dogs may therefore be conveniently distinguished as the "operating-dog" and the "idle dog," respectively.

The operation is as follows: The piston, being, for example, at the lower end of the cylinder, the tripping mechanism and ratchet mechanism of the valve are in the positions shown in Figs. 1, 4, and 5, the valve being then in position to admit compressed air through the port $4^g$ to the lower end of the cylinder and permit the air to vent through the port $5^g$ from the upper end. Assuming that compressed air is supplied through the compressed-air-supply pipe, the piston will be moved upward in the cylinder, carrying upward the trip-dogs on the collar S. One of these dogs, projecting upward from its pivot on the collar, passes up alongside the trip-bar without engaging it, and is the idle dog in this stroke. During the same time the other dog, which projects on the other side of the piston, rises to its trip-bar and the angle $4^u$ of its head $4^U$ enters between the beveled surface $4^m$ of the stop-rib $2^M$ on the plate M and the end of the trip-bar, which projects beyond said surface, and thereby engages the trip-bar, so that the farther upward movement of the piston causes this, which is the operative dog, to rock the trip-bar away from the stop-rib. The point $5^u$ of the head $4^U$ of the other dog not having passed the upper end of the trip-bar before the latter commenced to rock, said dog would be tripped aside by the rocking of the bar, such tripping of the idle dog being permitted by the yielding of the spring V, but in the absence of the flange $2^T$, as the piston continues to rise, the idle dog would slide off the end of the trip-bar and the dog would resume its upright position and would occupy the same during the remainder of the upward stroke. The operation, in so far as it is affected by the flange $2^T$, will be described later. The rocking of the trip-bar about its axis, caused by the engagement of the head $4^U$ of the active dog, in any event continues as the piston rises. The reaction of the spring L, operating through the trip-bar N upon the active dog, will have no tendency to rock that dog outward on its pivot until the point of contact of the dog with the trip-bar is above the axis of the latter, since prior to that time the pressure of the spring would be exerted inwardly upon the dog, and in that direction the dog is positively stopped, as above explained; but after that point is passed the tension of the spring L tends to rock the active dog outward, and at some point after this position is passed this tendency will be sufficient to overcome the restraining-pressure of the spring V, and the active dog will be rocked outward until it encounters the rib $1^T$ on the plate T, which is thus located for the purpose of checking the outward rocking of the dog and compelling the latter to continue without material deflection its upward course, and thereby to rock the trip-bar as the piston rises. The rocking movement of the trip-bar, transmitted to the rock-shaft $1^L$ through the lever-arm P, actuates longitudinally the link Q and rocks the lever J and retracts the pawl K over one tooth of the ratchet-wheel, and this movement of the piston causes the tooth $4^U$ of the active dog to run off of the trip-bar shortly after the pawl-tooth $1^K$ has dropped into a new notch of the wheel behind the tooth over which it has just been retracted, the tooth having some play in the notch, and the reaction of the spring L, rocking the rock-shaft $1^L$, will cause this lever-arm P to instantaneously operate the link Q, and thereby the lever-arm J and pawl K, and rotate the valve one stage and admit the compressed air to the upper end of the cylinder and permit its escape from the lower end.

The return movement of the piston, caused by this reversal of the air connections, causes the upwardly-projecting dog, which has been the idle dog in the operation already described, to operate upon the upper end of the trip-bar in the same manner as the lower trip-dog has been operating upon the lower end of said bar during the rising movement of the piston. Thus each stroke of the piston in either direction will cause the pawl to be retracted over one tooth of the ratchet-wheel, and the arrival of the piston at the limit of its stroke in either direction will, by releasing the trip-bar, permit the spring L to actuate the pawl to operate the ratchet-wheel and reverse the valve connections instantaneously.

When this mechanism is operated by compressed air furnished by a windmill or other source of power which is variable and liable to fail temporarily, it may sometimes happen that after the piston has been moved in either direction—for example, toward its upper limit—far enough to permit the idle dog to pass beyond the end of the trip-bar and before that stroke has been completed the air-pressure may fail or become insufficient to complete the stroke. If now during the interval before the pressure again becomes sufficient to cause the completion of the stroke, the waste of air from the cylinder or any other cause permits the piston to subside to the limit of its downward stroke. If the dog which was idle during the upward stroke could engage the upper end of the trip-bar while the piston is subsiding, such subsiding movement would cause that dog to operate the valve mechanism precisely as if such downward stroke had been an entire instead of a partial stroke, and the valve would thereby be rotated one stage and the air connections would be reversed, but the reversal that would have occurred upon the completion of the upward stroke having been skipped the reversal which would thus occur upon the completion of the downward stroke would admit the pressure at the wrong side of the piston, so that when such pressure should be again supplied it would not actuate the piston, but on the contrary would tend to hold it at the limit to which it had subsided. To prevent this result, and thereby completely adapt the structure to use in connection with a windmill or other variable and fallible source of power, is the purpose of the flange $2^T$ and of the expansion $1^N$ at the ends of the trip-bar. The operation of these parts of the construction is as follows: As the idle dog approaches the end of the trip-bar and collides therewith it is guided by the same laterally far enough so that before it runs off of the trip-bar the tooth $7^U$ has been carried past the end of the flange $2^T$, as seen in dotted position II of the parts in Fig. 22, and the dog is prevented from returning to its normal position until the tooth $7^U$ has passed the extreme end of the flange $2^T$. (See dotted position III, Fig. 22.) This flange is extended far enough toward the end of the path of the dog to hold the dog thus out of its normal path until the active dog has been carried so far that the rib $6^U$ has passed the shoulder $1^t$ on the flange $1^T$ at the opposite side. After this shoulder has been thus passed by the rib the spring L, causing the trip-bar to force the active dog against the flange $1^T$, will prevent the piston from subsiding, because in such subsiding movement the said rib will come into engagement with the shoulder and the weight of the piston will be supported thereon. The shoulder $1^t$ is so situated with respect to the ribs $6^U$ that even if the piston has risen far enough to retract the pawl over a tooth of the ratchet-wheel before it commences to subside, its subsidence will be arrested by the engagement of the rib $6^U$ with said shoulder before that movement has actuated the valve far enough to change the air connections, so that when the pressure is restored it will be exerted upon the same side of the piston as before the subsidence occurred, and will, therefore, simply lift the piston again and complete its stroke as if no intermission had occurred.

The tension of the spring L cannot be taken advantage of to cause the rib $6^U$ to engage the shoulder $1^t$ until after the trip-bar has been rocked past the horizontal position, because, as already noted, before that stage the pressure of the bar on the dog is inward and not outward, as necessary to make it engage said shoulder, and, since the idle dog passes the end of the trip-bar before the latter becomes horizontal, it is necessary to provide such a means as the flange $2^T$ to keep the idle dog out of the path, in which by subsidence it could engage the trip-bar until the active dog can reach a position at which the trip-bar acts outwardly against it; but there is another reason for locating the shoulder as it is shown. Even though the idle dog were by any means—as the flange $2^T$—prevented from engaging the trip-bar in case of premature subsidence, yet if such subsidence should occur after the pawl had run off the ratchet-tooth and become engaged with it ready upon reversal to actuate the valve and could continue until the valve should be thus actuated far enough to change the air connections the mischief would be done notwithstanding the other dog could not engage the trip-bar while thus subsiding. Hence the shoulder $1^T$ is so located that it arrests the subsiding piston before the pawl, even though engaged with a new tooth of the ratchet-wheel, can rotate the valve far enough to entirely cut off the air communication existing when such subsidence commenced. The renewal of the air-pressure, therefore, will operate upon the piston in the same direction as before the subsidence occurred and cause it to complete its stroke and effect the reversal of the connections in the proper time and manner.

For the purpose of preventing the accident last described—viz., the actuation of the valve by the subsidence of the piston, commencing after the pawl has passed off the tooth—the flange $1^T$ and its shoulders $1^t$ are alone sufficient protection, and the flange $2^T$ is necessary only to prevent the mischief resulting from such subsidence occurring after the idle dog has passed the end of the trip-bar and before the pawl has passed the tooth.

I claim—

1. In a pneumatic engine, a ratchet-valve which controls its air-supply, a spring and connections therefrom to the pawl of the ratchet-valve, whereby the recoil of the spring gives the pawl its ratchet-operating movement, a trip-bar connected with said spring, and a dog connected to the piston-rod and which engages the trip-bar as the piston moves and actuates it in direction to put the spring under tension and runs off said trip-bar at the limit of its stroke, whereby the ratchet-valve is operated instantaneously by the recoil of the spring, substantially as set forth.

2. In a pneumatic engine, in combination with a rotary ratchet-valve which controls the air-ports, a spring and connections therefrom to the valve-ratchet, whereby the recoil of the spring actuates the valve, a trip-bar connected to the spring, and two trip-dogs on the piston-rod which engage and actuate the trip-bar to put the spring under tension and release it to permit its recoil, the one during the stroke of the piston in one direction and the other during its stroke in the other direction, substantially as set forth.

3. In a pneumatic engine, in combination with a rotary ratchet-valve which controls the air-ports, a spring and connections therefrom to the valve-ratchet, whereby the recoil of the spring actuates the valve, a trip-bar connected to the spring, and two dogs pivoted to the piston-rod, which engage and actuate the trip-bar to put the spring under tension and release it to permit its recoil, one during the stroke of the piston in one direction and the other during its stroke in the other direction, and a spring which yieldingly holds the dogs in position to engage the trip-bar during the piston-strokes during which the trip-dogs respectively operate and permits them to yield past the trip-bar in the strokes in which they are respectively idle, substantially as set forth.

4. In a pneumatic engine, a ratchet-valve which controls its air-supply, a spring and connections therefrom to the pawl of the ratchet-valve, whereby the recoil of the spring gives the pawl its valve-operating movement, two dogs pivotally connected to the piston-rod and carried thereby in its reciprocating movement, a pivoted trip-bar connected to the spring, having the axis of its pivot at right angles to the piston-axis, and a stop which holds it normally extended both ways from the plane of said axes and with its opposite ends in the paths, respectively, of the heads of the dogs, and a spring which permits the dogs, respectively, to yield outwardly to pass the end of the trip-bar when moving in the direction in which the latter is restrained by its stop, substantially as set forth.

5. In combination with the ratchet-valve, the rock-shaft $1^L$, and the connections therefrom to the pawl of the ratchet-valve, the dogs pivotally connected to the piston-rod, the spring L, connected to the rock-shaft, and a trip-bar N, extending both ways from said rock-shaft, and a spring V, reacting between the two dogs, tending to hold their heads respectively in position to engage the ends of the trip-bar in the longitudinal movement of the piston, substantially as set forth.

6. In a pneumatic engine, in combination with the piston, dogs pivoted thereto and reciprocating therewith, the trip-bar fulcrumed on the frame and stopped against rotation in one direction with its ends in the path of the heads of the dogs, respectively, whereby the operative dog engaging it at one side rocks it and the idle dog encountering it at the other side is deflected by it, and a switch or guard $2^T$, corresponding to each dog and past the end of which the idle dog is deflected by the trip-bar and outside of which said dog becomes engaged before it runs off the trip-bar, whereby the idle dog is held outside the path along which it must return to engage the trip-bar until the entire length of said switch or guard has been traversed, substantially as set forth.

7. In combination, substantially as and for the purpose set forth, with a ratchet-valve which controls the air-supply of a pneumatic engine, the pawl which operates it, the spring L, and connections therefrom to the pawl of the ratchet-valve, whereby the recoil of the spring gives the pawl its ratchet-operating movement, the trip-bar N, connected with the spring, the dog secured to the piston-rod in position to engage and rock the trip-bar and run off from it at the limit of its stroke, the fixed guard or cam T, having the recess which forms the shoulder $1^t$, and the dog having an angle which passes said shoulder before it runs off the trip-bar and provided with a spring V, tending to hold it out of such engagement after it runs off the trip-bar and becomes free from the tension of the spring L.

8. In a pneumatic engine, a rotary ratchet-valve which controls the air-port, in combination with the piston, the dogs pivoted thereto, the trip-bar fulcrumed on the frame and stopped against rotation in one direction at a position at which its ends are in the path of the heads of the dogs, whereby one dog rocks it and the other is deflected by it as the piston reciprocates, a spring which tends to actuate the trip-bar toward its stop, connections from the trip-bar to the pawl of the ratchet-valve, whereby the rocking of the bar away from its stop retracts the pawl and the contrary movement actuates the valve, and a fixed guard or cam $1^T$ for each dog, having a recess which forms a shoulder $1^t$, the dog having an angle which passes said shoulder while it is actuating the trip-bar and is adapted to engage it on its return, said shoulder and angle being so located relatively that the angle passes the shoulder when the angular distance of the pawl from the point at which it will run off a ratchet-tooth is less than the angular movement of the valve necessary to close communicating ports, substantially as set forth.

9. In a pneumatic engine, in combination with the piston, dogs pivoted thereto and reciprocating therewith, the trip-bar fulcrumed on the frame and stopped against rotation in one direction with its ends in the path of the heads of the dogs, respectively, whereby the operative dog engaging at one side rocks it and the other dog encountering it at the other side is deflected, a switch $2^T$, corresponding to each dog and past the end of which the idle dog is deflected by the trip and outside of which said dog becomes engaged before it runs off the trip, and a fixed guard or cam $1^T$, corresponding to each dog and inside of which the dog travels, having a recess, which forms the shoulder $1^t$, the dog having an angle which passes said shoulder while it is actuating the trip-bar after the idle dog is engaged outside of the switch $2^T$, substantially as set forth.

10. In combination with a rotary valve, the ratchet on its stem, the detent-pawl $1^I$, and the pawl K, which actuates said ratchet, having the stop-shoulder $2^K$ and the spring $3^K$ resting upon the back of the ratchet and having its end in such position that the shoulder $2^K$ collides with it simultaneously with the dropping of the detent-pawl $1^I$ from a tooth of the ratchet, substantially as set forth.

11. In a pneumatic engine, in combination with a rotary ratchet-valve which controls the air-ports, a spring and connections therefrom to the valve-ratchet, whereby the recoil of the spring actuates the valve, a trip-bar connected to the spring, and two dogs pivoted to the piston-rod which engage and actuate the trip-bar to put the spring under tension and release it to permit its recoil, one during the stroke of the piston in one direction and the other during its stroke in the other direction, the dogs being normally in position to engage the trip-bar during the stroke of the piston during which they respectively operate and adapted to yield past the trip-bar in the stroke in which they are respectively idle, substantially as set forth.

In testimony whereof I have hereunto set my hand in the presence of two witnesses, at Chicago, Illinois, this 3d day of November, 1891.

THOMAS O. PERRY.

Witnesses:
FRED E. SMITH,
WILL A. SPRAGUE.